(12) United States Patent
Kotrotsios et al.

(10) Patent No.: US 6,404,539 B1
(45) Date of Patent: Jun. 11, 2002

(54) LIGHT SOURCE FOR OPTICAL DATA TRANSMISSION

(76) Inventors: Giorgos Kotrotsios, 26 rue de la Gare, CH-1163 Etoy; Claude Stricker, 13, Planies, CH-1315 La Sarraz, both of (CH)

( * ) Notice: Subject to any disclaimer, the term of this patent is extended or adjusted under 35 U.S.C. 154(b) by 0 days.

(21) Appl. No.: 09/513,422

(22) Filed: Feb. 25, 2000

Related U.S. Application Data

(60) Provisional application No. 60/164,422, filed on Nov. 9, 1999.

(51) Int. Cl.[7] ............................................. H01S 3/00
(52) U.S. Cl. .................................... 359/341.1; 359/188
(58) Field of Search ......................... 359/341.1, 337.2, 359/337.21, 180, 188

(56) References Cited

U.S. PATENT DOCUMENTS

| | | |
|---|---|---|
| 4,637,025 A | 1/1987 | Snitzer et al. |
| 4,938,556 A | 7/1990 | Digonnet et al. |
| 5,050,949 A | 9/1991 | DiGiovanni et al. |
| 5,185,749 A | 2/1993 | Kalman et al. |
| 5,271,024 A | 12/1993 | Huber |
| 5,436,760 A | 7/1995 | Nakabayashi |
| 5,566,018 A | 10/1996 | Lee et al. |
| 5,764,406 A | 6/1998 | Newhouse et al. |
| 6,195,200 B1 * | 2/2001 | DeMarco et al. ............ 359/341 |

FOREIGN PATENT DOCUMENTS

| | | |
|---|---|---|
| EP | 0 317 478 A2 | 5/1989 |
| EP | 0 766 357 A1 | 2/1997 |
| EP | 0829 979 | 3/1997 |
| EP | 0 938 164 A2 | 8/1999 |
| JP | 5072035 | 3/1993 |
| WO | WO 98/50987 | 11/1998 |

* cited by examiner

*Primary Examiner*—Mark Hellner

(57) ABSTRACT

The light source has as pumping light source a semiconductor laser with a wavelength of 980 nm. This pumps by way of a coupler a monomode optical fibre which is doped with erbium ions. The erbium ions emit a wideband light spectrum. The spectrum has maximum values 1532 nm and 1556 nm. A minimum value lies between them at approximately 1538 nm. The light spontaneously emitted by the erbium ions is amplified in the same monomode optical fibre (erbium dopted fibre amplifier EDFA). A Fabry-Pérot filter is disposed 1 m before an end of the EDFA and adjusteed in such a way that it selectively transmits light with a wavelength of 1538 nm, whereby this part of the spectrum is preferably amplified during further passage through the EDFA. At the opposite end of the EDFA light leaves thereby with an approximately uniform spectrum.

17 Claims, 9 Drawing Sheets

LIGHT SOURCE FOR OPTICAL DATA TRANSMISSION

RELATED APPLICATION

This application is an English language equivalent of Provisional Application 60/164,422 filed Nov. 9, 1999.

DESCRIPTION

The invention relates to a light source for optical data transmission and to a fibre amplifier for amplifying an optical input signal.

Optical fibres offer an enormous capacity for optical data transmission in binary form. Most such systems currently in operation work with lasers which emit light with a wavelength of approximately 1300 nm. The laser light is modulated with the data to be transmitted and is coupled into monomode fibres which transport the data over the desired distance. Known techniques for light sources, modulators, detectors, amplifiers etc. permit a transmission rate of 10 Gbps with this technique.

In order further to increase the transmission rates or capacities, one single optical fibre is used for simultaneous transmission of a plurality of data channels. In this case light with a different wavelength is used for each individual data channel. This technique is known as o wavelength domain multiplexing (WDM). In this case each individual data channel retains a transmission capacity of 10 Gbps. The total transmission capacity of the system is then a multiple of 10 Gbps.

In order to achieve WDM the largest possible plurality of wavelengths is required simultaneously. For this purpose at present a corresponding plurality of usually monochromatic lasers, e.g. semiconductor lasers, is operated simultaneously alongside one another. In this case each laser requires its own control system and its own power supply unit. Overall a plurality of individual lasers increases the susceptibility of the total system to disruption and increases the costs.

The object of the invention is to create a single simple and economical light source or such a fibre amplifier for the optical communication by means of WDM.

This object is achieved according to the invention by a light source with the features of claims 1 or 16 or respectively by a fibre amplifier with the features of claim 12.

The light source according to the invention has a pumping light source for generating pumping light at a first wavelength. This pumping light source may be a suitable lamp. As a rule, however, the pumping light source will be a laser, preferably a semiconductor laser. The central element of the light source is an optical fibre which is doped with an active laser medium. Rare-earth ions such as erbium or neodymium may be considered in particular as active laser medium. The pumping light source must be chosen in such a way that the laser medium can be excited at the wavelength of the pumping light source.

Most laser media, particularly the rare-earth ions, generate emission light with a wavelength spectrum with at least one wavelength range of high power, typically two maximum values, and at least one wavelength range with relatively lower power, typically a minimum value between the maximum values.

In order that the laser medium can be excited, the light source has a means for coupling the pumping light into the doped optical fibre. This means may consist of concave mirrors which guide the light laterally onto the doped optical fibre, or it may be an optical arrangement for final pumping of the doped optical fibre.

The active laser medium absorbs a proportion of the pumping light and as a result it goes over into an electronically excited state. Then the active laser medium spontaneously emits wideband radiation and does so to some extent at such shallow angles that some of the radiation is captured in the doped optical fibres. The captured spontaneous radiation is amplified in the doped optical fibre by stimulated emissions (amplified spontaneous emission ASE).

Most laser media have an emission spectrum which is characterised by maximum power values and minimum power values, that is to say it is far from being uniform. According to the invention light in the wavelength range with relatively lower power of the emission spectrum is partially selected with the aid of a selection means in or on the doped optical fibre. In this way this part of the spectrum is preferably amplified during further passage through the doped optical fibre.

In a total system for optical data transfer the wide spectrum is then broken down into individual wavelengths. This may take place in various known manners, for instance with narrow-band interference filters connected downstream or with the aid of gratings, e.g. in a so-called demultiplexer. The individual wavelengths are in each case modulated by themselves in order to transmit data and thus each form a transmission channel. Then the various wavelengths are brought together again, for instance in a so-called multiplexer, and are jointly coupled into an optical fibre and transmitted through it.

The wideband light source according to the invention is distinguished by an extremely simple construction. Therefore it is less susceptible to disruption, it is robust and can be produced at low cost.

At least one Fabry-Pérot filter or an interference filter can be inserted as selection means into a portion of the doped optical fibre. Furthermore a periodic modulation of the refractive index in the core of the doped optical fibre can be provided.

In an advantageous embodiment of the invention the doped optical fibre is a monomode fibre. The wideband light is generated thereby with minimal divergence. Furthermore it can be easily coupled into other fibres.

A particular convenient construction of the wideband light source according to the invention is produced if the pumping light source is a semiconductor laser, the radiation of which is coupled into a second monomode fibre. Furthermore an optical coupler which has three ports can be used, the first port being coupled to the second monomode fibre, the second port being coupled to one end of the doped optical fibre and the third port being coupled to a third monomode fibre. In this case the coupler is constructed in such a way that the pumping light from the second monomode fibre is coupled into the doped optical fibre. Thus the doped optical fibre is finally pumped. Furthermore the coupler is constructed in such a way that the emission light from the doped optical fibre is coupled into the third monomode fibre. Thus the emission light proceeds without power losses to the output of the wideband light source. This construction is also particularly well suited to mass production and assembly.

In order to obtain an even wider spectrum, the doped optical fibre can be doped with a mixture of various rare-earth ions.

In an advantageous embodiment the light source according to the invention additionally has a means for selecting a plurality of individual wavelength ranges from the emission spectrum. This means may be a Fabry-Pérot filter or a demultiplexer. Or it may be formed by a periodic modulation of the refractive index in the core of the doped optical fibre (Bragg grating), the periodic modulation being designed in such a way that it reflects a plurality of individual wavelength ranges.

By such an additional means the total radiant energy is concentrated onto the lines or spectral ranges which are really used. Thus the radiant energy is better utilised.

By the use of a Fabry-Pérot filter as the said additional means the line width as well as the spacing or the number of lines can be freely chosen and altered. Thus a system which can be reconfigured is obtained which can be reconfigured in a simple manner. Also the wavelength of the lines can be regulated, e.g. by comparison with a reference wavelength.

Thus overall a simple light source is obtained which generates individual lines at different wavelengths with the same intensity.

The inventive ideas for the light source according to the invention can also be advantageously used for a fibre amplifier for amplifying an optical input signal. Such a fibre amplifier has a pumping light source for generating pumping light at a first wavelength. It also has an optical fibre which is doped with an active laser medium which can be excited at a first wavelength, whereby it can emit emission light with a wavelength spectrum with at least one wavelength range of high power and at least one wavelength range with relatively lower power. The pumping light source and the optical input signal are coupled by way of a coupler into a first end of the doped optical fibre.

A selection means is located in the doped optical fibre, usually immediately after the coupler. It selects light in the wavelength range with relatively lower power of the emission spectrum, whereby this part of the spectrum is preferably amplified during further passage through the doped optical fibre.

At the second end of the doped optical fibre is located an optical isolator which allows the passage of light which enters the optical fibre from the first end.

The fibre amplifier according to the invention offers a smooth amplification profile for the majority of wavelengths which in principle can be amplified with the doped fibre.

A particularly simple construction of the amplifier is produced if a suitable adjusted Fabry-Pérot filter is inserted as selection means into a portion of the doped optical fibre.

Similar effects may be achieved with an interference filter which moreover has the advantage that it leads to a monolithically compact construction.

Furthermore a periodic modulation of the refractive index may be provided as selection means in the core of the doped optical fibre.

A further light source according to the invention has a plurality of wideband light sources which emit light with a flat spectral development in each case in the respective spectral range, wherein the spectral ranges of the wideband light sources overlap and are slightly displaced relative to one another. The wideband light sources are preferably light emitting diodes (LED). However, they may also be light sources as claimed in claim 1. The light from these wideband light sources is initially overlaid. Then a plurality of individual wavelength ranges is selected from the overlaid spectrum, for example with the aid of a Fabry-Pérot filter. In this way a light source is obtained which emits a plurality of individual spectral lines.

Further advantageous embodiments of the inventions are characterised in the subordinate claims.

The invention is explained in greater detail below with reference to the embodiments which are illustrated schematically in the drawings. In the individual figures of the drawings the same reference numerals denote the same elements. In detail:

Figure 1:
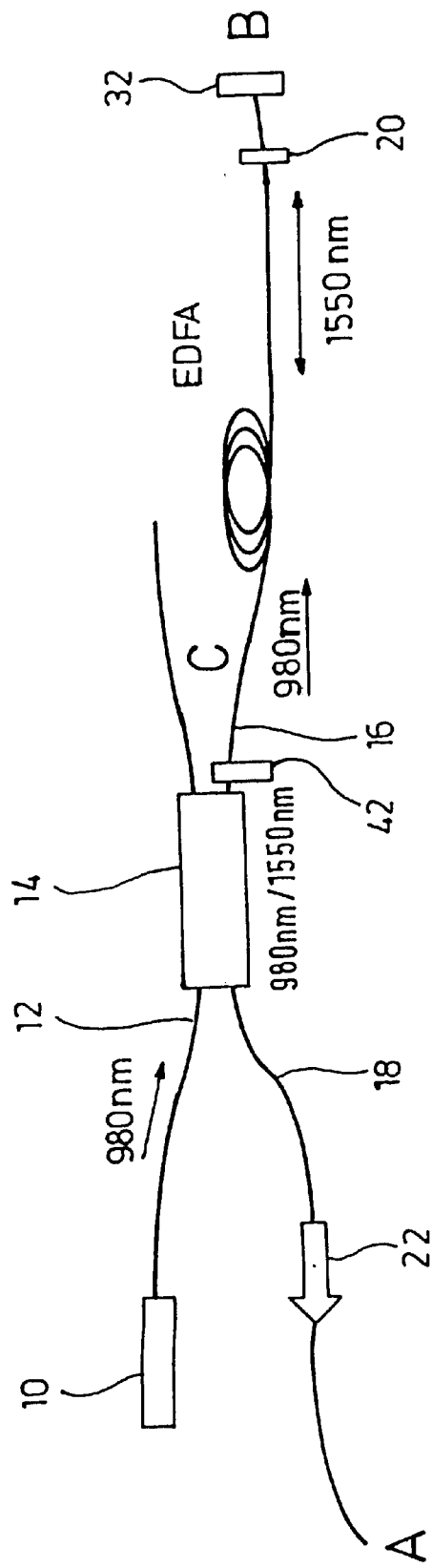
FIG. 1 shows a schematic representation of the construction of the wideband light source.

In the construction of the wideband light source shown schematically in FIG. 1 the pumping light source 10 is a semiconductor laser at a wavelength of 980 nm with a power of approximately 90 mW. The laser radiation of the pumping laser is coupled into a monomode fibre 12.

The monomode fibre 12 is coupled by way of an optical coupler 14 to a second monomode fibre 16 in such a way that the radiation from the first monomode fibre 12 passes over, substantially without loss, into the second one. For the coupler 14, components may for example be used such as are used in WDM for bringing together two different wavelengths into one fibre (multiplexer).

In the embodiment according to FIG. 1 the coupler 14 is adjusted in such a way that it couples the radiation of the pumping laser 10 at 980 nm as completely as possible into the second monomode fibre 16. On the other hand, radiation at approximately 1550 nm (see below) entering the coupler 14 from the second monomode fibre 16 is not coupled back into the first monomode fibre 12. Rather, the coupler 14 is adjusted in such a way that this radiation is coupled into a third monomode fibre 18, the end of which is denoted by A.

The second monomode fibre 16 is an optical fibre amplifier which is doped with approximately 300 ppm erbium ions, a so-called EDFA (erbium doped fibre amplifier). The latter is between 7 and 20 m long. The end C of the EDFA 16 facing the coupler 14 is made from a material the refractive index of which corresponds to that of the usual glass fibres. In this way reflections at the coupling location are reduced.

The light of the pumping laser 10 is then partially absorbed by the erbium ions in the EDFA 16. The latter spontaneously emit light at a wavelength between approximately 1530 and 1570 nm, and do so to some extent at angles which are captured in the monomode fibre. The captured radiation is amplified in the EDFA 16 by stimulated emission. Thus amplified spontaneous emission (ASE) takes place.

Figure 2:
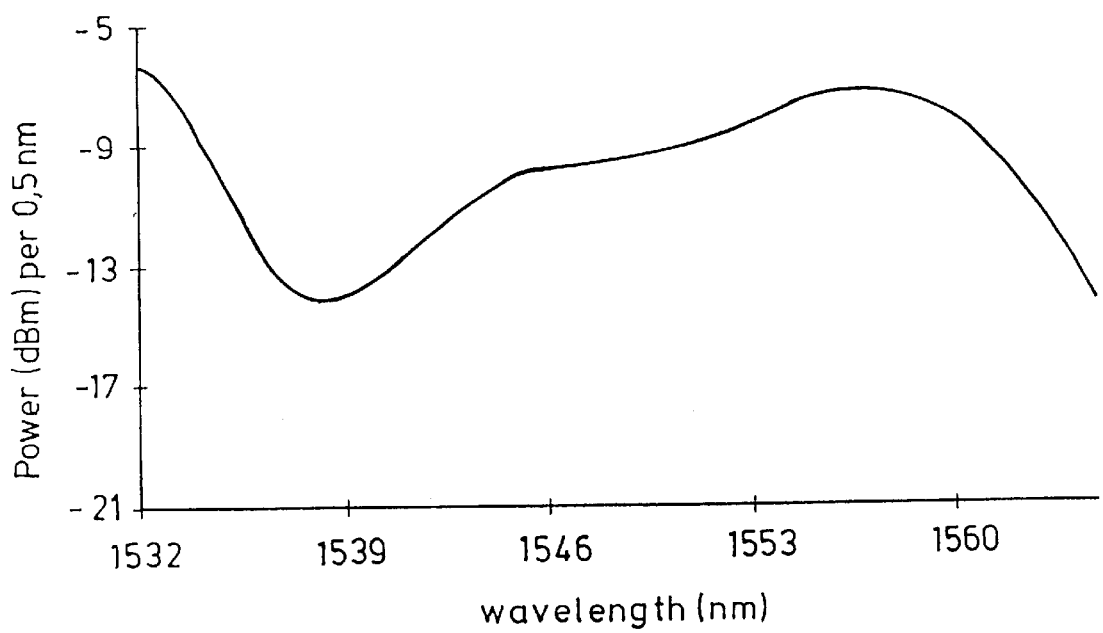
FIG. 2 shows the spontaneous emission spectrum of erbium.

At each end C, B of the EDFA 16 there is initially a weak wideband radiation, the spectrum of which is characterised by strong maximum and minimum values. The observed spontaneous spectrum of an erbium-doped fibre laser is illustrated in FIG. 2. FIG. 2 shows the power for each 0.5 nm wavelength in decibels as a function of the wavelength in nanometres. The spectrum has a first maximum value at 1532 nm and a second maximum value at 1556 nm, which turns out approximately 2 to 3 dB weaker. In between is a minimum value at approximately 1538 nm, which is approximately 8 dB weaker than the maximum value at 1532 nm. The amplification of the spontaneous emission leads to a concentration of the radiation around the two maximum values. The total emission spectrum has a bandwidth of approximately 40 nm.

Erbium ions belong to the class of so-called three-level systems. A proportion of the radiation travelling along the optical fibre is reabsorbed by the erbium itself. This applies more strongly to the short-wave proportion of the radiation. Therefore longer fibres have a spectrum which has an increased proportion of long-wave radiation relative to shorter fibres.

In a first embodiment light at the wavelength of 1538 nm is selectively transmitted through a filter means for flattening of the emission spectrum.

A Fabry-Pérot filter 20 serves for this. A Fabry-Pérot filter is an optical arrangement of two transparent, plane parallel, partially reflecting plates which are disposed at a distance d from one another which corresponds to a multiple m of the half-wavelength $\lambda/2$ of the desired light passing through. Thus $$d = m\frac{\lambda}{2} \quad (1)$$

m is given as the order of the Fabry-Pérot filter.

In the present case the Fabry-Pérot filter 20 is formed by the gap or the surfaces of two completely separate fibres which are disposed head-to-head and are inserted into ceramic ferrules.

A maximum transmission is desired around the minimum value of the spectrum at 1538 nm, corresponding to a frequency v of 195 THz. The full width at half maximum FWHM of the transmission line should amount to approximately 5 nm or 0.63 THz. It results from FSR(v)

$$FWHM(v) = \frac{FSR(v)}{F} \quad (2)$$

where FSR(v) is the so-called free spectral range, i.e. the distance between adjacent lines which are transmitted by the Fabry-Pérot filter. It results from $$FSR(v) = \frac{c}{2d} \quad (3)$$

where c is the speed of the light between the reflecting plates. The free spectral range FSR(v) should be chosen in such a way that the adjacent transmitted lines lie outside the amplification spectrum of the EDFA, i.e. at approximately 50 nm or 6.3 THz. The distance d then results from formula (3) at approximately d≈23 μm. By a precise adjustment of the distance d according to formula (1) it is ensured that the maximum value of the transmission line lies precisely at the spectral minimum value of 1538 nm.

F is the finesse of the Fabry-Pérot filter and is given by $$F = \frac{\pi\sqrt{R}}{1 - R} \quad (4)$$

where R is the reflectivity of the mirror surfaces. In the present example the free spectral range amounts to 50 nm and the full width at half maximum of the transmission line is 5 nm. Thus F=10 results from formula (2). R=73% is obtained from formula (4). The surfaces of the fibres in the uncoated state have a reflectivity R of approximately 4% for the radiation in the EDFA. However, the reflectivity R can be suitably chosen by coating. In this case the coating should reflect the range around 1538 nm as homogeneously as possible, whilst the pumping wavelength of 980 nm should be transmitted by the coating.

This selectively transmitted spectral range around 1538 nm is additionally amplified during further passage through the EDFA 16. If at the end B of the EDFA 16 the light is reflected back by a reflector 32 into the fibre 16, then the selectively transmitted spectral range undergoes an amplification over a longer piece of the EDFA 16 than light which has not been transmitted through the Fabry-Pérot filter 20 but reflected.

A further possibility consists of using the Fabry-Pérot filter not for selective transmission by for selective reflection. For this purpose the distance between the two surfaces of the Fabry-Pérot filter is adjusted in such a way that a maximum reflection or minimum transmission for light with a wavelength of 1538 nm is produced. Maximum transmission values can be integral multiples remote from 6 nm: one at 1538 nm−6 nm=1532 nm and one at 1538 nm+3*6 nm=1556 nm, that is to say precisely at the maximum power values to be attenuated. The spacing of the maximum transmission values or of the FSR would then be 12 nm or 1.5 THz, and the spacing d of the two surfaces of the Fabry-Pérot filter would result from formula (3) as approximately 98 μm. In such a case a reflector could be omitted at the end B of the EDFA 16.

Both possibilities can be used in combination. In principle the spectrum of the light source can be intentionally optimised with a plurality of Fabry-Pérot filters.

The Fabry-Pérot filter 20 can be disposed at any location in the EDFA 16. In the presently preferred embodiment the Fabry-Pérot filter 20 was installed in the EDFA 16 one metre away from the end B.

The flattening of the spectrum can be optimised by variation of the position of the Fabry-Pérot filter 20, the spacing d and the reflectivity R of the mirror surfaces.

Furthermore, optionally a reflector 32 which reflects emerging light back into the optical fibre 16 can additionally be used at the end B of the optical fibre 16. The reflector 32 can be constructed as a selective reflector which reflects light of the wavelength of 1538 nm back into the optical fibre 16 more strongly than light of other wavelengths, e.g. in the form of a dielectrically coated mirror or a suitable Bragg grating in the fibre 16. Another possibility is a plurality of Bragg gratings disposed one behind another which each reflect individual wavelength ranges with a predetermined reflectance in order to produce a flattened spectrum. In the last-mentioned cases the reflector 32 can also be used alone, without the Fabry-Pérot filter 20.

The end of the EDFA 16 denoted by C is located in the coupler 14 mentioned above. Also located in the coupler 14 is the third monomode fibre 18 which is provided for the optical transmission of data, the radiation emerging at the end thereof denoted by A. In order to avoid disruptive reflections at the end A of the fibre 18 which could alter the shape of the spectrum, a usual optical isolator 22 is installed in the fibre 18 before the end A.

A power of the wideband laser of approximately 10 mW is achieved with the described arrangement.

Figure 3:
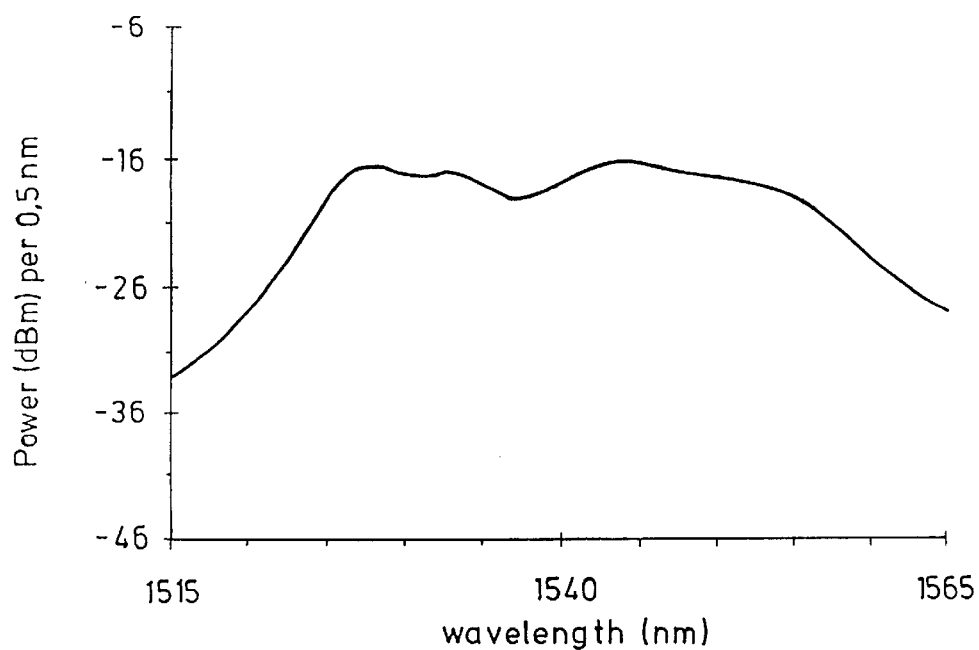
FIG. 3 shows the uniform spectrum achieved with the wideband light source.
Figure 4:
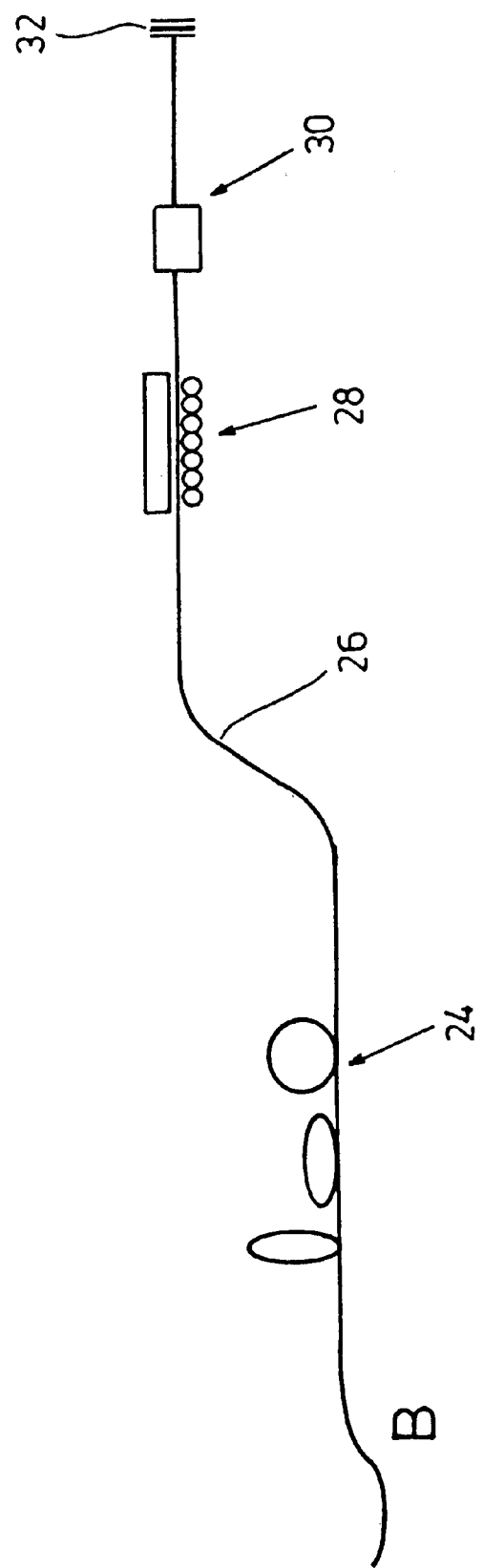
FIG. 4 shows a schematic representation of the construction of a selection means which uses polarisation effects.

FIG. 3 shows the power in decibels as a function of the wavelength for a flattened spectrum. FIG. 3 shows a marked flattening of the minimum value when a selectively transmitting Fabry-Pérot filter 20 is disposed one metre from the end B of the EDFA 16. In this case the W spacing of the two plates of the Fabry-Pérot filter 20 is adjusted in such a way that an optimum transmission of the radiation in the range of the minimum, i.e. radiation with a wavelength of approximately 1538 nm, is produced. Thus in the present embodiment a depth of the minimum value of only 2.5 dB could be reached between 1535 and 1555 nm. By further optimisation of the position and finesse F of the Fabry-Pérot filter 20 a depth up to ±1 dB can be achieved.

2$^{nd}$ Embodiment

A flattening of the spectrum of the light source can also be achieved by utilising polarisation effects. For this purpose a linearly polarising section of fibre 24 which linearly polarises the ASE initially follows on either side of the end B of the optical fibre 16. The polarised light is input in one of the two characteristic directions of a polarisation-maintaining fibre 26. Then a part of the light spectrum, e.g. the part around 1538 nm, is selectively rotated in the direction of polarisation by 90°. This can be achieved by a suitable periodic disturbance of the position of the optical axis 28 of the optical fibre (microbends). For this purpose the optical fibre is pressed in a known manner against a succession several centimetres long of rollers 28 which are aligned parallel, rest against each other and have a diameter which corresponds to the beat length of the polarisation-maintaining fibre (approximately 1–3 mm). In this case the direction of the pressing force is inclined by 45° relative to the characteristic axis of the polarisation-maintaining fibre 26.

There follows a further linearly polarising section of fibre 30, which serves as analyser and only allows the passage of a part of the light spectrum which in this example lies close to 1538 nm. A reflector 32 which reflects the selected light of the desired wavelength back into the fibre is disposed right at the end of the fibre. The light passes through the listed components in the reverse direction and thus again reaches the end B of the optical fibre 16. From B it is led through the amplifying section of fibre EDFA before it reaches the end C and after passing through the coupler 14 it leaves the fibre at A.

3$^{rd}$ Embodiment

A flattening of the spectrum of the light source can also be achieved by a periodic modulation of the refractive index in the form of the fibre in the form of a long-wave grating. Such a grating outputs light from the mode guided in the fibre into radiated modes, i.e. selective light losses occur. With a suitable choice of the parameters the bandwidth of the coupling amounts to several nanometres, so that the maximum radiation can be output at 1532 nm. In this case the intensity of the output can be chosen in such a way that the maximum power value at 1532 nm is attenuated in such a way that a uniform spectrum is produced.

Furthermore a second grating can be integrated into the fibre core in order to attenuate the maximum at 1556 nm.

By suitable choice of this long-wave grating the spectrum can be completely flattened.

4$^{th}$ Embodiment

Instead of the Fabry-Pérot filter according to the first embodiment at least one interference filter can also be used which has suitable transmission or reflection properties. The resulting construction can be stable and compact. With such a construction low manufacturing tolerances can be easily achieved.

5$^{th}$ Embodiment

In the presently preferred embodiment a second Fabry-Pérot filter 42 is additionally used which selects a plurality of individual wavelength ranges from the emission spectrum. In order to select the plurality of individual wavelengths as far as possible at the beginning of the amplification operation in the EDFA 16, the Fabry-Pérot filter 42 is disposed approximately 0.5 to 2 m away from the end C of the EDFA 16.

In the choice of suitable parameters for the Fabry-Pérot filter 42 it should be noted that the transmission rate of an optical data line is determined by the minimum pulse width of the optical pulses. This results essentially from the relation $$\text{Transmission rate}=1/\text{pulse width} \quad (5)$$

but a factor 2 should possibly be taken into consideration for raising, depending upon which type of modulation is chosen for the transmission. However, the pulse width is associated with the spectral full width at half maximum FWHM according to $$\text{pulse width}*\text{FWHM}(v) \geq 1 \quad (6)$$

from which the following limitation for the transmission rate is obtained $$\text{transmission rate}=1/\text{pulse width} \leq \text{FWHM}(v) \quad (7)$$

Thus at a desired transmission rate of currently 10 Gbps this results in a FWHM(v) of 10 GHz. If in addition a spacing of the individual lines of FSR=50 GHz according to the ITU standard is sought, in order to be able to transmit as many lines as possible simultaneously, then a spacing of d=3 mm results from formula (3). Also a finesse of F=5 results from formula (2) and a reflectivity of R=54% results from formula (4).

Thus within the useful bandwidth of the EDFA amplifier 16 amounting to approximately 40 nm or 5 THz 100 lines can be separated from one another and thus 100 transmission channels can be created each at a transmission rate of 10 Gbps. In all, according to the preferred embodiment a transmission rate of 1 THz is produced.

A prerequisite for the application of the given formulae (1) to (4) is the incidence of parallel light on the reflecting surfaces of the Fabry-Pérot filter. However, the light diverges as it leaves a fibre. It may therefore be advantageous to use lenses, e.g. self-focussing lenses (selfoc lenses) or fibre lenses before the Fabry-Pérot filter for parallelisation of the light. If divergent light passes through a Fabry-Pérot filter then a somewhat increased spectral bandwidth FWHM is produced. This can be compensated for again by increasing the reflectivity R. In addition the EDFA acts in such a way that it somewhat reduces the FWHM of the lines because it amplifies higher signal components better.

6$^{th}$ Embodiment

Figure 6:
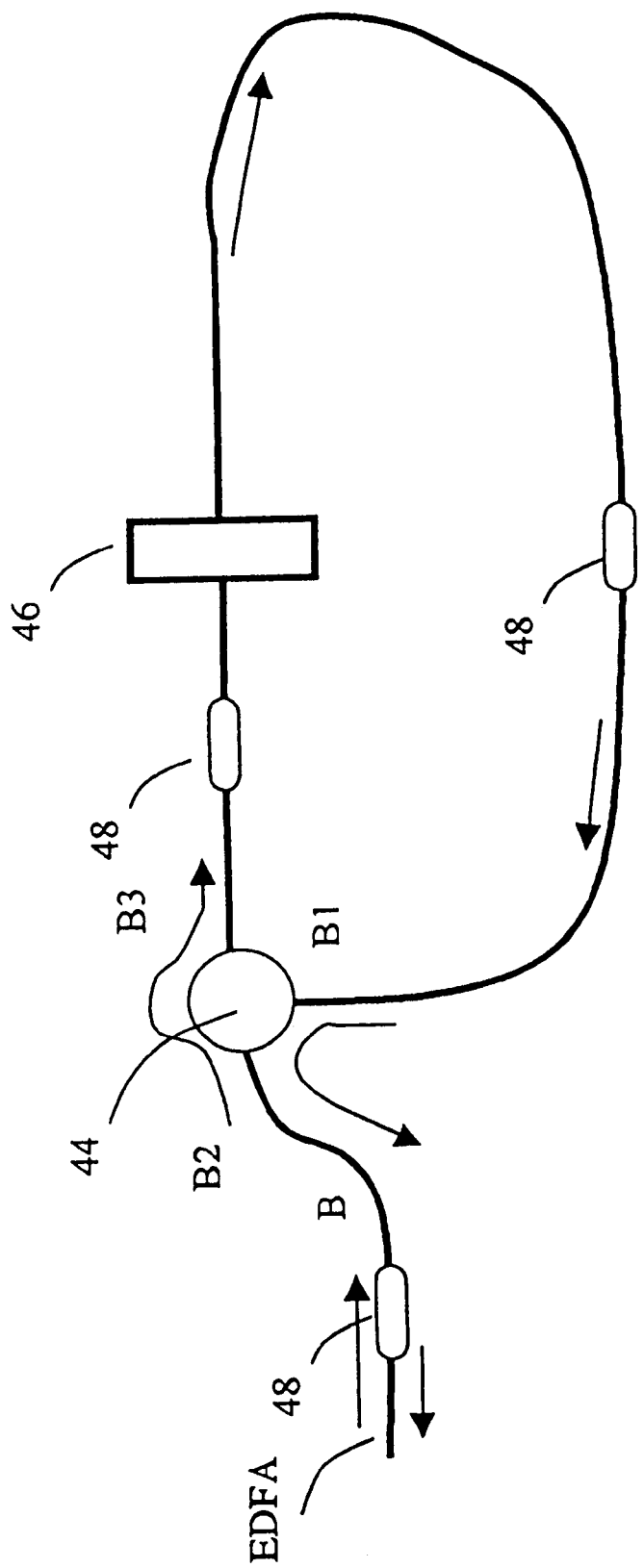
FIG. 6 shows a schematic representation of the construction of the light source with a Fabry-Pérot filter used in transmission.

Alternatively the Fabry-Pérot filter may be disposed not near the end C of the EDFA 16 but at the end B. This is illustrated in FIG. 6. The spontaneously emitted fluorescent light comes out of the EDFA 16 and enters a circulator 44. This has three ports or branches B1, B2, B3. The circulator essentially acts as follows: light coming from the branch B1 enters the circulator, and emerges again from the branch or output B2. Light coming from the branch B2 enters the circulator and emerges again from the branch or output B3.

In the illustrated example the light coming from the EDFA 16 enters B2 and leaves the circulator correspondingly through B3. After B3 is located the Fabry-Pérot filter 46, connected to B3 by a connecting element (splice) 48. The Fabry-Pérot filter 46 selects the individual wavelength ranges. The output of the Fabry-Pérot filter 46 is connected to the branch or port B1 of the circulator 44. Thus the filtered light leaves the circulator 44 through the branch or output B2, i.e. it propagates through the EDFA 16 back to the coupler 14 and is thereby amplified.

Figure 7:
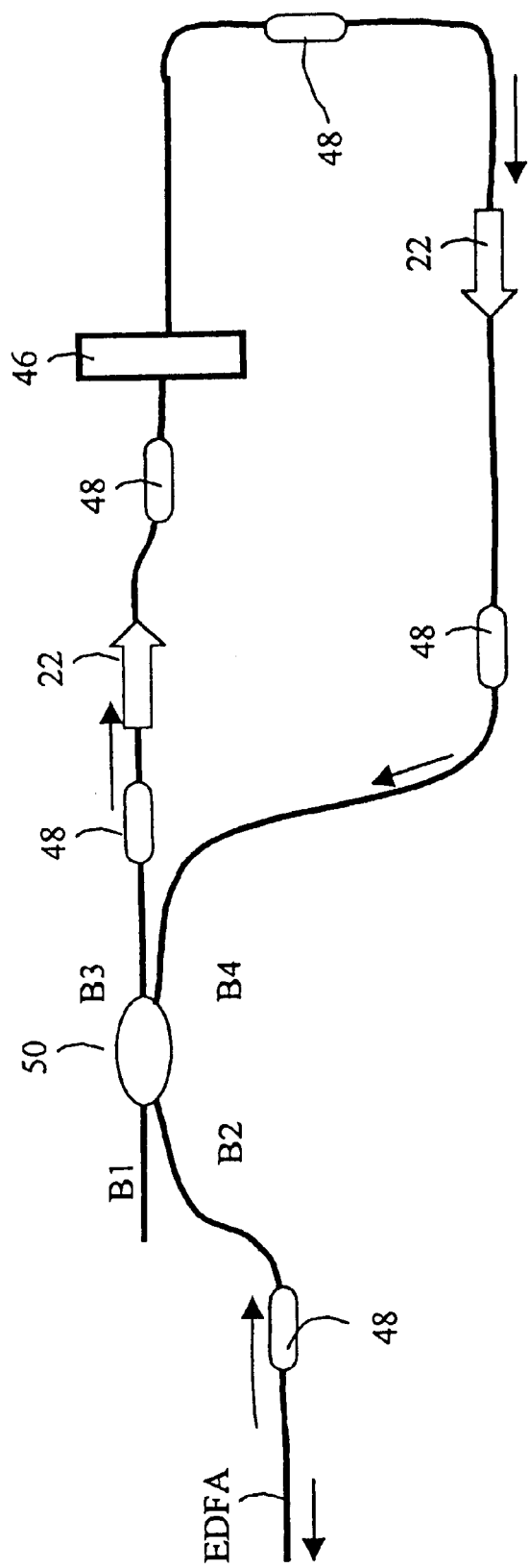
FIG. 7 shows the schematic representation of FIG. 6 including optical isolator.

An alternative construction of the return arrangement according to FIG. 6 is shown in FIG. 7. In the embodiment according to FIG. 7 a coupler 50 with four ports B1, B2, B3, and B4 is used as central connecting element. In FIG. 7 the light coming out of the EDFA 16 enters the port B1. The coupler 50 passes the light on to the two outputs B3 and B4, the light output being distributed as a rule in equal proportions over the two outputs. Thus a proportion of the light leaves the coupler 50 through the output B3. Behind B3 is located an optical isolator 22 which only allows light from the output B3 to pass through but not light from the output B4. Thus the isolator 22 ensures a well-defined direction of propagation of the light. Behind the isolator 22 is located the Fabry-Pérot filter 46, connected to the isolator 22 by a splice 48. The Fabry-Pérot filter 46 selects the individual wavelength ranges. The output of the Fabry-Pérot filter 46 is advantageously connected by a splice 48 to a second optical isolator 22. This only allows light from the Fabry-Pérot filter 46 to pass through, but not light from the output B4. The optical isolator 22 is connected by way of a further splice 48 to the port B4 of the coupler 50. The coupler 50 passes the light on to the two outputs B1 and B2, the light output being distributed as a rule in equal proportions over the two outputs. Thus a proportion of the light leaves the coupler 50 through the output B2, i.e. it propagates through the EDFA 16 back to the first coupler 14 (see FIG. 1) and is thereby amplified.

In principle the coupler 14 can also be constructed in the form of a circulator 56 (FIG. 9) with three ports. In this case the optical isolator 22 can be dispensed with.

As a consequence of the amplified spontaneous emission (ASE) the light source generates a wideband background in the entire wavelength spectrum amplified by the EDFA 16. Before the light from the light source is fed into a network for optical data transmission, it is advantageous to filter out this wideband background. For this purpose, in a further development of the embodiments according to FIGS. 6 and 7, the light is again passed through the Fabry-Pérot filter 46. However, in order to avoid feedback or laser effects, which lead to fluctuations of the intensities of the individual wavelength ranges inter alia because of mode competition, the light must be passed through the Fabry-Pérot filter 46 in the opposite direction relative to the embodiments according to FIGS. 6 and 7.

Figure 8:
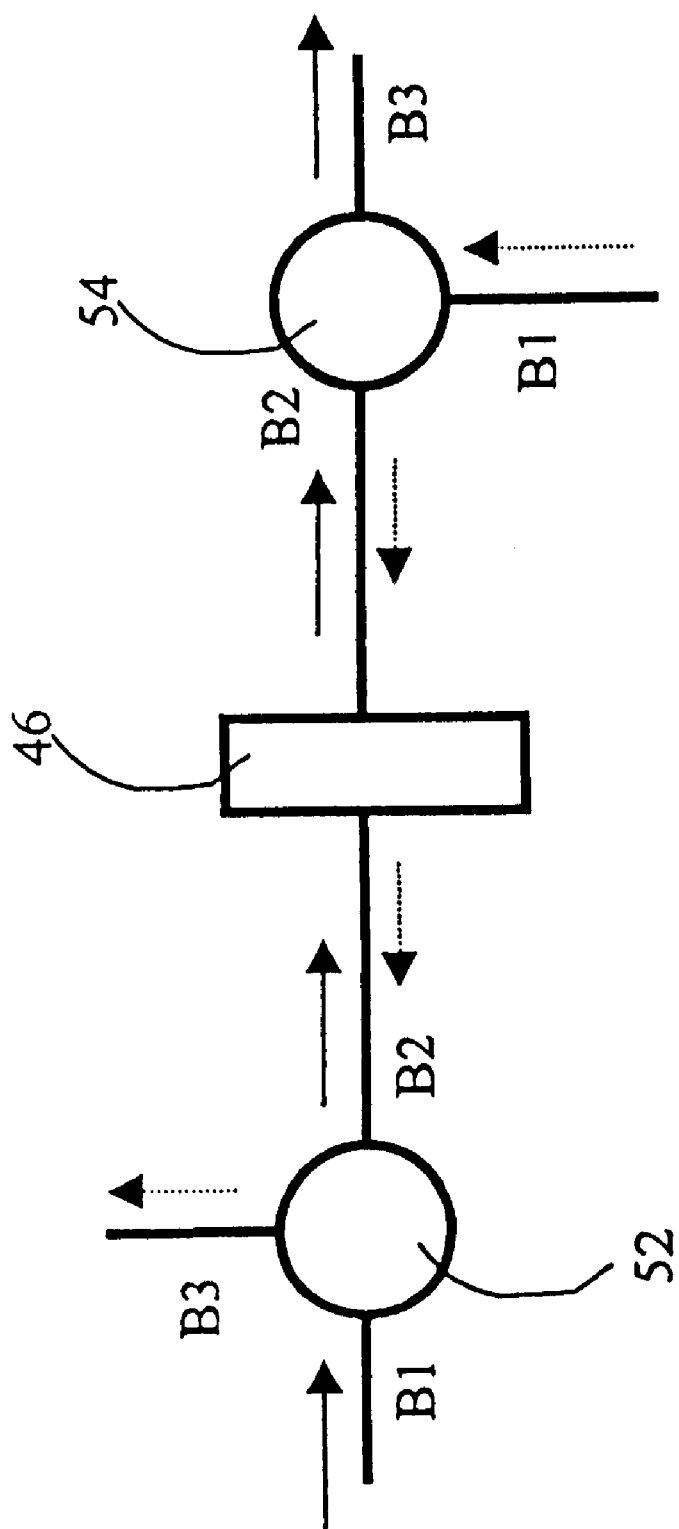
FIG. 8 illustrates the use of optical circulators to determine the direction of transmission through the Fabry-Pérot filter.

One possible way of achieving this is shown in FIG. 8, which by way of example shows a detail from FIG. 6 around the Fabry-Pérot filter 46. Between the output B3 of the optical circulator 44 according to FIG. 6 and the Fabry-Pérot filter 46 a second optical circulator 52 is inserted. In this case the output B3 of the optical circulator 44 according to FIG. 6 is coupled to the port B1 of the second circulator 52. The light entering the port B1 of the circulator 52 leaves the latter through the output B2. From there it is passes, as in FIG. 6, through the Fabry-Pérot filter 46. A third circulator 54 is disposed between the Fabry-Pérot filter 46 and the port B1 of the circulator 44 according to FIG. 6. The light from the Fabry-Pérot filter 46 is passed to the port B2 of the third circulator 54 and leaves the latter through the output B3. This latter is coupled to the port B1 of the circulator 44 according to FIG. 6. Thus the insertion of the two circulators 52 and 54 does not change anything on the light path according to Figures or 7.

The wavelength-selected light amplified in the EDFA 16 can now, however, be passed again through the Fabry-Pérot filter 46. For this purpose it is coupled into the port B1 of the third circulator 54. It therefore leaves the circulator 54 through the port B2. This latter is coupled to the Fabry-Pérot filter 46. The light passes through the Fabry-Pérot filter in the opposite direction and reaches the second circulator 52 through the port B2. It therefore leaves the second circulator 52 through the output B3. Thus it does not return to the EDFA 16. Feedback is avoided, and the wideband background is filtered out by the Fabry-Pérot filter 46.

Figure 9:
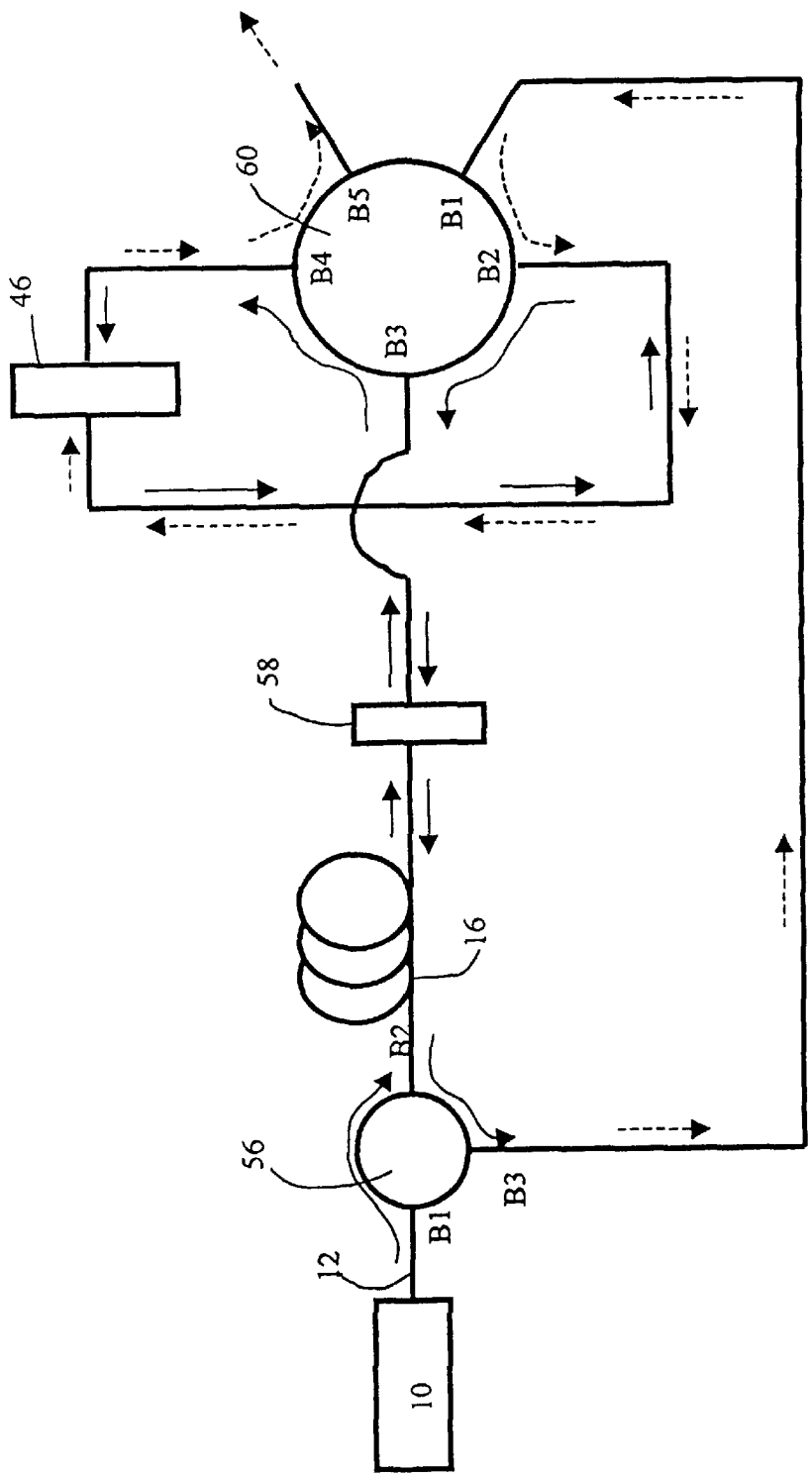
FIG. 9 shows a schematic representation of the construction of the light source using a five port optical circulator.

Alternatively, instead of the three circulators 44, 52, 54 a circulator with five ports can also be used. The resulting construction is shown in FIG. 9.

The light from the pumping light source 10 is coupled by way of the first monomode fibre 12 into the port B1 of a circulator 56 which serves as a coupler and has three ports. The light leaves the circulator 56 through the output B2. The EDFA 16 in which amplified spontaneous emission (ASE) is generated is coupled to the output B2. At the end of the EDFA 16 is located a selectively absorbing interference filter 58 through which the light passes in its further progress in both directions and which ensures a uniform intensity of the individual lines or wavelength ranges.

After the EDFA 16 and the interference filter 58 is located a circulator 60 with five ports. The spontaneously emitted and partially amplified fluorescent light from the EDFA 16 is coupled into the port B3. It leaves from the output B4 and then passes through the Fabry-Pérot filter 46 in which the plurality of wavelength ranges for the individual lines is selected. The output of the Fabry-Pérot filter 46 is coupled to the port B2. From there the filtered light proceeds back to the output B3 and thus back to the EDFA 16, where it is amplified.

After passing through the EDFA 16 again, the light passes to the port B2 of the circulator 56 which it leaves through the output B3.

The renewed filtering of the amplified light for suppression of the wideband background takes place in such a way that the amplified light from the output B3 of the circulator 56 is coupled into the port B1 of the circulator 60 with five ports. From there it proceeds to the output B2 of the circulator 60. This latter is coupled to the Fabry-Pérot filter 46. The light now passes through the Fabry-Pérot filter 46 in the reverse direction. After the Fabry-Pérot filter 46 it proceeds to the port B4, from which it is passed on to the output B5.

After the output B5 of the circulator 60 the light is suitable for further processing for optical message transmission.

Within the scope of the invention numerous modifications and further developments of the described embodiments can be made.

Figure 5:
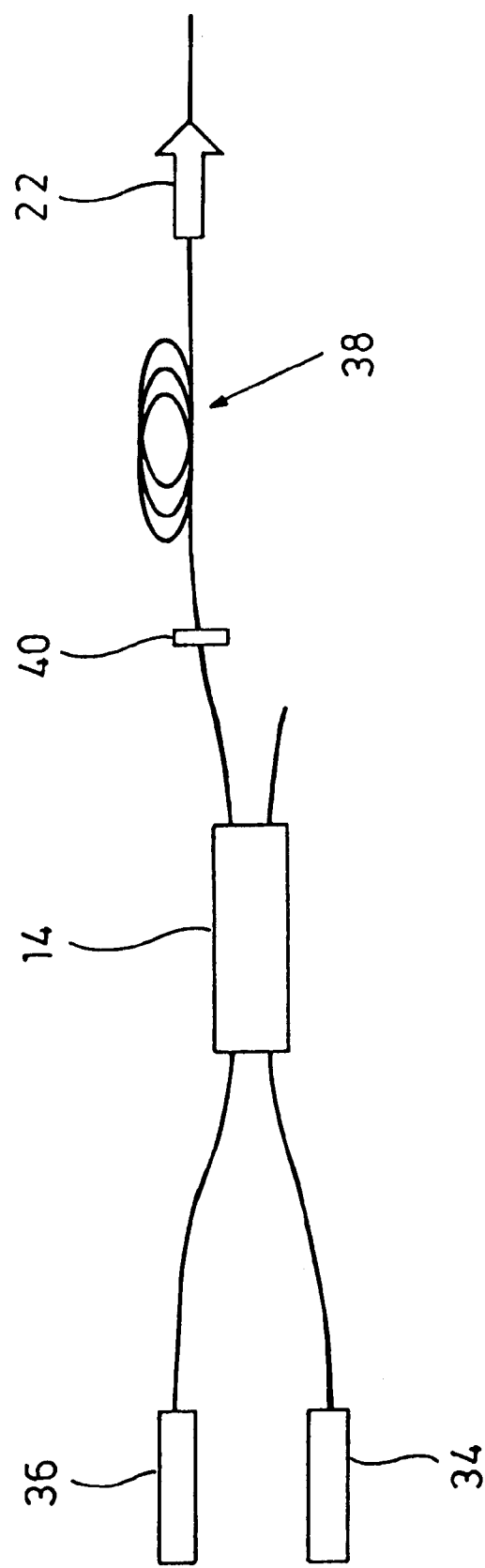
FIG. 5 shows a schematic representation of the construction of a fibre amplifier.

Thus the described selection mechanisms can be equally used for flattening the spectrum of fibre amplifiers (EDFA). Without such selection mechanisms EDFA show an inhomogeneous amplification, in which light with wavelengths around 1532 and 1556 nm is amplified better. FIG. 5 shows an EDFA with a pump laser 34, an optical input signal 36, a coupler 14, an amplifying section of fibre 38 and an optical isolator 22. In addition the EDFA has one of the described selection arrangements 40.

Instead of using selectively transmitting or reflecting means, selectively absorbing means can generally be used.

Furthermore, the described techniques can be used not only for the wavelengths referred to in the embodiments but for any wavelengths. The same applies to the rare-earth ions mentioned.

Also the so-called L-band can additionally be used, i.e. wavelengths in the range from 1565 to approximately 1610 nm. These are optically separated, e.g. by filter or coupler, from the so-called C-band between approximately 1530 and 1565 nm. Signals in the L-band can then be supplied separately for amplification in, for example, an EDFA.

The Fabry-Pérot filter can also be produced with the aid of Bragg gratings in the optical fibre which serve as reflectors. An alteration in the properties of this Fabry-Pérot filter can be achieved by stretching and compressing the fibres.

The Bragg gratings do not have to be constructed in the EDFA itself. They can also be constructed in one or a plurality of optical fibres which are coupled to the EDFA 16 by way of an optical coupler. Such a construction could be in modular form.

The components mentioned may also be used in ring lasers which are made up of optical fibres.

Apart from the mentioned monomode fibres, doublecore fibres can also be used. They have an outer core which is constructed as a multimode light guide, and an inner core which is constructed as a monomode light guide. The outer core conducts the pumping light, which typically originates from a high-power semiconductor laser. The inner core conducts the generated fluorescent light and the ASE of the rare-earth ions. The coupler 14 must be chosen appropriately for such double-core fibres.

The reflectivity of the two reflecting surfaces of the Fabry-Pérot filter can also be different. One surface can also be almost completely reflecting.

As Fabry-Pérot filters it is also possible to use so-called confocal Fabry-Pérot filters, i.e. those with two focusing mirrors, the radii of curvature of which correspond to their reciprocal spacing d. The spacing d is then a multiple m of a quarter of the wavelength λ of the light passing through. Thus $$d = m\frac{\lambda}{4} \quad (8)$$

The free spectral range FSR(v) then results from $$FSR(v) = \frac{c}{4d} \quad (9)$$

where c is the speed of the light between the reflecting plates. The finesse F of a confocal Fabry-Pérot filter is given by $$F = \frac{\pi R}{1 - R^2} \quad (10)$$

where R is the reflectivity of the mirror surfaces.

All the mentioned components can also be used one behind the other in a plurality of amplifiers.

The preferred application of the light source according to the invention is probably in optical data transmission. However, the light source can also be used advantageously for sensors which with the aid of optical fibres detect the slightest movements of structures such as bridges, tunnels and high-rise buildings and monitor the occurrence of small cracks in these structures.

Within the scope of the invention it is also possible to replace the EDFA 16 by another amplifying and waveguiding medium, e.g. by an integrated optical component. Furthermore, the pumping light source 10, the coupler 14 and the EDFA 16 can be replaced as a whole by a semiconductor amplifier. The ASE generated by the semiconductor amplifier is then filtered by the Fabry-Pérot filter 46 and led back again into the semiconductor amplifier.

What is claimed is:

1. A light source for optical data transmission with:
    a pumping light source for generating pumping light at a first wavelength;
    an optical fiber which is doped with an active laser medium which can be excited at a first wavelength, whereby it emits emission light with a wavelength spectrum with at least one wavelength range of high power and at least one wavelength range with relatively lower power;
    a means for coupling the pumping light into the doped optical fiber, whereby the laser medium is excited, the emission light of the laser medium being partially propagated in the doped optical fiber;
    a selection means in or on the doped optical fiber for partial selection of light in the wavelength range with relatively lower power of the emission spectrum, whereby this part of the spectrum is preferably amplified during further passage through the doped optical fiber;
    the doped optical fiber is doped with a mixture of various rare-earth ions.

2. The light source as claimed in claim 1, characterized by a means for selecting a plurality of individual wavelength ranges from the emission spectrum whereby the means is selected from a group consisting of a Fabry-Pérot filter or a periodic modulation of the refractive index in the core of the doped optical fiber, the periodic modulation being designed in such a way that it reflects a plurality of individual wavelength ranges.

3. The light source as claimed in claim 2, characterized in that the Fabry-Pérot filter is disposed on the end of the optical fiber remote from the coupling means in such a way that light from the optical fiber is transmitted only in a preferred direction through the Fabry-Pérot filer and that the light transmitted through the Fabry-Pérot filter can be passed back into the optical fiber.

4. The light source as claimed in claim 3, characterized by a means which allows the wavelength-selected light, after amplification in the optical fiber, to be passed through the Fabry-Pérot filter against the preferred direction.

5. The light source as claimed in claim 4, characterized in that the means is an optical circulator with five ports,
    wherein the end of the optical fiber remote from the coupling means is connected to the third port;
    the Fabry-Pérot filter being coupled between the fourth and second ports;
    the wavelength-selected light, after amplification in the optical fiber being passed into the first port, whereby it passes through the Fabry-Pérot filter again and leaves the circulator through the fifth port.

6. A light source for optical data transmission with:
    a pumping light source for generating pumping light at a first wavelength;
    an optical fiber which is doped with an active laser medium which can be excited at a first wavelength, whereby it emits emission light with a wavelength spectrum with at least one wavelength range of high power and at least one wavelength range with relatively lower power;

a means for coupling the pumping light into the doped optical fiber, whereby the laser medium is excited, the emission light of the laser medium being partially propagated in the doped optical fiber;

a selection means in or on the doped optical fiber for partial selection of light in the wavelength range with relatively lower power of the mission spectrum, whereby this part of the spectrum is preferably amplified during further passage through the doped optical fiber;

a Fabry-Pérot filer for selecting a plurality of individual wavelength ranges from the emission spectrum;

wherein the Fabry-Pérot filter is disposed on the end of the optical fiber remote from the coupling means in such a way that light from the optical fiber is transmitted only in a preferred direction through the Fabry-Pérot filter and that the light transmitted through the Fabry-Pérot filter can be passed back into the optical fiber.

7. The light source as claimed in claim 6 characterized by a means which allows the wavelength-selected light, after amplification in the optical fiber, to be passed through the Fabry-Pérot filter against the preferred direction.

8. The light source as claimed in claim 7 characterized in that the means is an optical circulator with five ports;

wherein the end of the optical fiber remote from the coupling means is connected to the third port;

the Fabry-Pérot filter being coupled between the fourth and second ports;

the wavelength-selected light, after amplification in the optical fiber being passed into the first port, whereby it passes through the Fabry-Pérot filter again and leaves the circulator through the fifth port.

9. The light source as claimed in claim 6 characterized in that the doped optical fiber is doped with a mixture of various rare-earth ions.

10. A fiber amplifier for amplifying an optical input signal with:

a pumping light source for generating pumping light at a first wavelength;

an optical fiber which is doped with an active laser medium which can be excited at a first wavelength, whereby it can emit emission light with a wavelength spectrum with at least one wavelength range of high power and at least one wavelength range with relatively lower power;

means for coupling the pumping light and the optical input signal into a first end of the doped optical fiber;

an optical isolator at the end remote from the first end of the doped optical fiber which allows the passage of light entering the optical fiber from the first end;

a selection means in or on the doped optical fiber for partial selection of light in the wavelength range with relatively lower power of the emission spectrum, whereby this part of the spectrum is preferably amplified during further passage through the doped optical fiber;

the doped optical fiber is doped with a mixture of various rare-earth ions.

11. A light source for optical data transmission with:

an amplifying waveguide medium for generating amplified spontaneous emission and for amplifying an optical input signal;

a means for selecting a plurality of individual wavelength ranges from the amplified spontaneous emission spectrum of the amplifying waveguide medium; and a coupling means for coupling the amplified spontaneous emission of the amplifying waveguide medium in such a way into the selecting means that the amplified spontaneous emission is transmitted through the selecting means and that the transmitted light can be passed back into the amplifying waveguide medium.

12. The light source as claimed in claim 11 characterized in that the amplifying waveguide medium is a semiconductor amplified.

13. The light source as claimed in claim 11 characterized in that the means for selecting a plurality of individual wavelength ranges from the emission spectrum is selected from a group consisting of a Fabry-Pérot filter or a periodic modulation of the refractive index in the core of an optical fiber, the periodic modulation being designed in such a way that it reflects a plurality of individual wavelength ranges.

14. A light source as claimed in claim 11 characterized by a means for equalization of the optical output power of the spectrum.

15. A light source a claimed in claim 13 characterized in that the Fabry-Pérot filter is disposed in such a way that light form the amplified spontaneous emission of the amplifying waveguide medium is transmitted only in a preferred direction through the Fabry-Pérot filter and that the transmitted light can be passed back into the amplifying waveguide medium.

16. A light source as claimed in claim 15 characterized by a means which allows the wavelength-selected light, after amplification in the amplifying waveguide medium to be passed through the Fabry-Pérot filter against the preferred direction.

17. A light source as claimed in claim 16 characterized in that the means is an optical circulator with five ports, wherein one end of the amplifying waveguide medium is connected to the third port;

the Fabry-Pérot filter being coupled between the fourth and second ports;

the wavelength-selected light, after amplification in the amplifying waveguide medium being passed into the first port, whereby it passes through the Fabry-Pérot filter again the leaves the circulator through the fifth port.

\* \* \* \* \*